US012795016B2

(12) United States Patent
Arumugam et al.

(10) Patent No.: US 12,795,016 B2
(45) Date of Patent: Nov. 10, 2026

(54) SYSTEMS AND METHODS FOR DYNAMICALLY DETERMINING PROCEDURES FOR ELECTRONIC COMMUNICATIONS USING CELLULAR AUTOMATON PROCESSING

(71) Applicant: BANK OF AMERICA CORPORATION, Charlotte, NC (US)

(72) Inventors: Rajalakshmi Arumugam, Chennai (IN); Anjali Niskeode, Hyderabad (IN); Raman Natarajan, Hyderabad (IN); Revathi Satya Kishori Kolluri, Hyderabad (IN); Susheel Chiluka, Hyderabad (IN); Malini Jeyaseelan, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 425 days.

(21) Appl. No.: 18/505,687

(22) Filed: Nov. 9, 2023

(65) Prior Publication Data

US 2025/0159072 A1 May 15, 2025

(51) Int. Cl.

*G06F 17/00* (2019.01)
*G06F 7/00* (2006.01)
*G06N 20/00* (2019.01)
*H04M 1/72436* (2021.01)
*G06V 30/10* (2022.01)

(52) U.S. Cl.

CPC ........ *H04M 1/72436* (2021.01); *G06N 20/00* (2019.01); *G06V 30/10* (2022.01); *H04M 2201/42* (2013.01)

(58) Field of Classification Search

CPC .......... H04M 1/72436; H04M 2201/42; G06N 20/00; G06V 30/10
USPC .......................................................... 707/737
See application file for complete search history.

(56) References Cited

U.S. PATENT DOCUMENTS 7,565,577 B2 * 7/2009 Adams ................ H04L 41/0686 714/27
10,558,339 B1 * 2/2020 Pitelka .................. G06F 16/245
10,922,487 B2 * 2/2021 Patel ..................... G06F 40/274
(Continued)

*Primary Examiner* — Pavan Mamillapalli
(74) *Attorney, Agent, or Firm* — Moore & Van Allen PLLC; Lauren M. Stokes

(57) ABSTRACT

Systems, computer program products, and methods are described herein for dynamically determining procedures for electronic communications using cellular automaton processing. The present invention is configured to identify at least one enquiry message; determine, based on the an enquiry message(s), a case type(s) associated with the enquiry message(s); trigger an intelligent classification component, wherein the intelligent classification component is configured to determine a procedure(s) for the enquiry message(s); trigger a cellular automaton engine which comprises an array of a plurality of cells in a grid-based structure, and wherein the cellular automaton engine is configured to select and perform at least one procedure for the enquiry message(s); determine, by the cellular automaton engine, a best procedure based on the selection and performance of the procedure(s) for the enquiry message(s); and generate a response(s) for the enquiry message(s) based on the determined best procedure by the cellular automaton engine.

20 Claims, 10 Drawing Sheets

(56) References Cited

U.S. PATENT DOCUMENTS

| | | | | |
|---|---|---|---|---|
| 2012/0028606 | A1* | 2/2012 | Bobotek | H04L 51/212 455/411 |
| 2015/0133176 | A1* | 5/2015 | Blount | H04W 4/12 455/466 |
| 2017/0223168 | A1* | 8/2017 | Singh | H04W 4/12 |
| 2022/0318545 | A1* | 10/2022 | Poff | G06V 10/44 |
| 2025/0131758 | A1* | 4/2025 | Husarik | G06V 30/18 |

* cited by examiner

SYSTEMS AND METHODS FOR DYNAMICALLY DETERMINING PROCEDURES FOR ELECTRONIC COMMUNICATIONS USING CELLULAR AUTOMATON PROCESSING

FIELD OF THE INVENTION

The present invention embraces a system for dynamically determining procedures for electronic communications using cellular automaton processing.

BACKGROUND

Electronic messages which are regularly automatically sorted and responded to within computing networks and systems. However, when electronic messages are received and cannot be automatically sorted, classified, or responded to, then manual intervention is often required. The problem of manual intervention occurring for these electronic messages is tens of thousands may be received daily and manual intervention may not be possible when there is so much demand. The problem is even further exacerbated when the response necessary to deal with the electronic communication requires searching for, receiving, and gathering data from different storage components, databases, and/or the like. Thus, there exists a need for a system, method, and/or apparatus that can automatically, dynamically, efficiently, and securely determine procedures for dealing with electronic communications and generating responses therefrom with little to no manual intervention.

Applicant has identified a number of deficiencies and problems associated with automatically and dynamically determining procedures when dealing with electronic enquiry messages. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamically determining procedures for electronic communications using cellular automaton processing. The system may comprise: a memory device with computer-readable program code stored thereon; at least one processing device, wherein executing the computer-readable code is configured to cause the at least one processing device to perform the following operations: identify at least one enquiry message; determine, based on the at least one enquiry message, at least one case type associated with the at least one enquiry message; trigger an intelligent classification component, wherein the intelligent classification component is configured to determine at least one procedure for the at least one enquiry message; trigger a cellular automaton engine, wherein the cellular automaton engine comprises an array of a plurality of cells in a grid-based structure, and wherein the cellular automaton engine is configured to select and perform at least one procedure for the at least one enquiry message; determine, by the cellular automaton engine, a best procedure based on the selection and performance of the at least one procedure for the at least one enquiry message; and generate at least one response for the at least one enquiry message based on the determined best procedure by the cellular automaton engine.

In some embodiments, the computer-readable code is configured to cause the at least one processing device to perform the following operation cluster the at least one enquiry message in a group based on the at least one case type.

In some embodiments, the computer-readable code is configured to cause the at least one processing device to perform the following operations: generate a validation interface component, wherein the validation interface component comprises at least one input message and at least one output message, wherein the at least one input message and the at least one output message are based on the at least one enquiry message; and transmit the validation interface component to a user device, wherein the validation interface component configures a graphical user interface of the user device and shows the at least one input message and the at least one output message. In some embodiments, the validation interface component is generated using an artificial intelligence (AI) based optical character recognition (OCR) component, and wherein the AI based OCR component is configured to validate the at least one input message and the at least one output message. In some embodiments, the validation interface component comprises a plurality of validation interface components, and wherein each validation interface component comprises the at least one input message or the at least one output message. In some embodiments, the validation interface component is overlayed with a legacy application interface component on the graphical user interface of the user device, and wherein the legacy application interface component is based on a legacy application associated with the at least one enquiry message.

In some embodiments, the intelligent classification component comprises a reinforcement-based learning model, computer-readable code is configured to cause the at least one processing device to perform the following operations: apply the at least one enquiry message to a reinforcement-based learning model; and determine, by the reinforcement-based learning model, the at least one procedure for the at least one enquiry message, wherein the at least one procedure is based on at least one mapping of the at least one procedure and required data.

In some embodiments, the reinforcement-based learning model is trained by the computer-readable code is causing the at least one processing device to perform the following operations: collect a set of historical data classifications associated with a set of historical enquiry messages and a set of historical procedures; create a first training dataset comprising the set of historical data classifications, the set of historical enquiry messages, and the set of historical procedures; and train the reinforcement-based learning model in a first stage using the first training dataset.

In some embodiments, the reinforcement-based learning model is further trained by the computer-readable code is causing the at least one processing device to perform the following operations: collect a set of reinforcement messages associated with the set of historical classifications, the set of historical enquiry messages, and the set of historical procedures; create a second training dataset comprising the set of reinforcement messages; and train the reinforcement-based learning model in a second stage using the second training dataset. In some embodiments, the reinforcement-based learning model is further trained by the computer-readable code is causing the at least one processing device to perform the following operations: collect a set of standard procedures associated with an attribute of the set of historical enquiry messages; create a standards training dataset comprising the set of standard procedures; and train the reinforcement-based learning model in a derivative stage using the standards training dataset.

In some embodiments, the computer-readable code is causing the at least one processing device to perform the following operations: determine, by the cellular automaton engine, whether the best procedure requires unknown data; generate, by the cellular automaton engine and based on the determination the best procedure requires unknown data, a request for the unknown data, wherein the request comprises a storage component identifier associated with the unknown data; transmit the request for the unknown data to a storage component associated with the storage component identifier; and receive the unknown data from the storage component.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
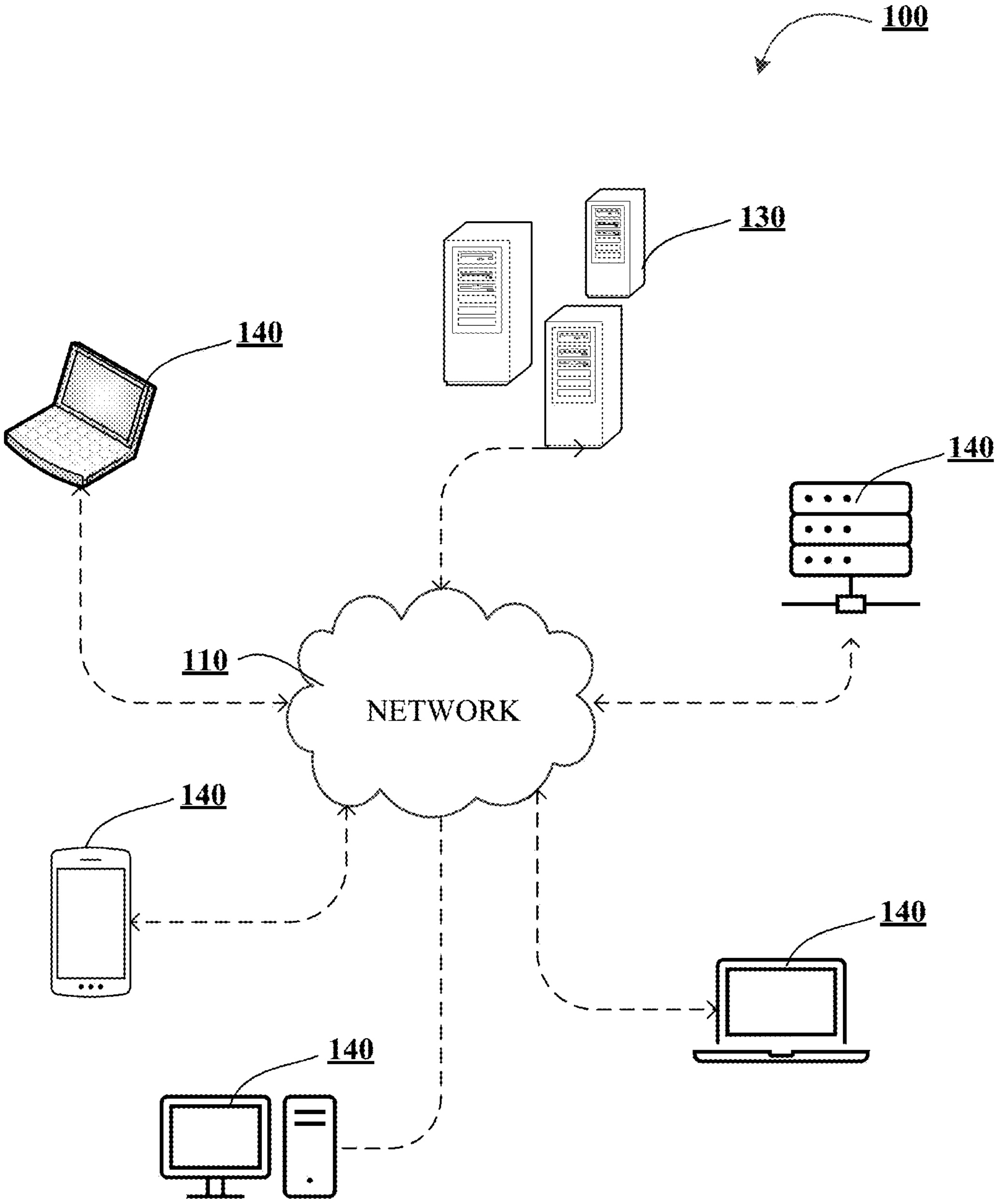
Figure 1B:
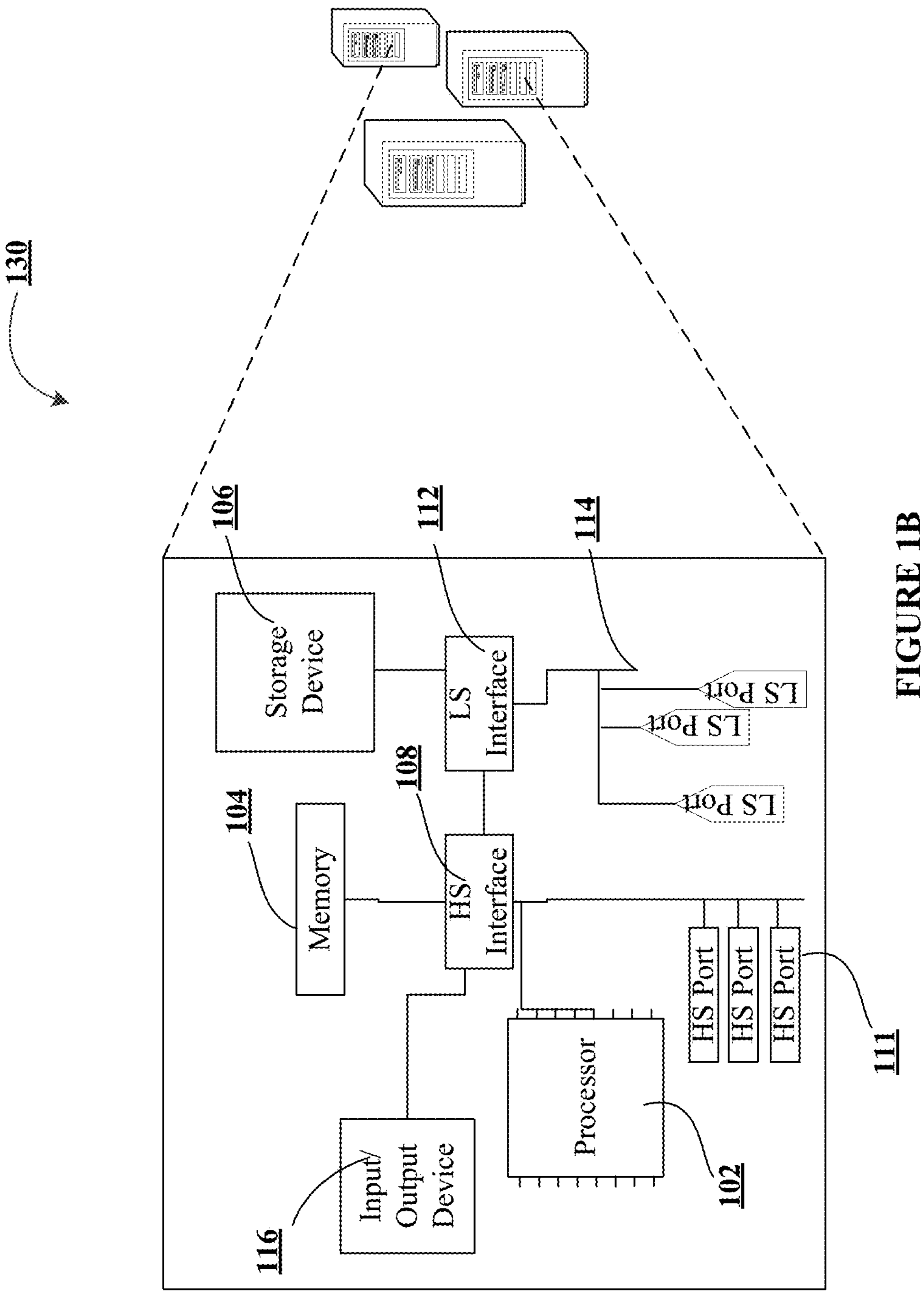
Figure 1C:
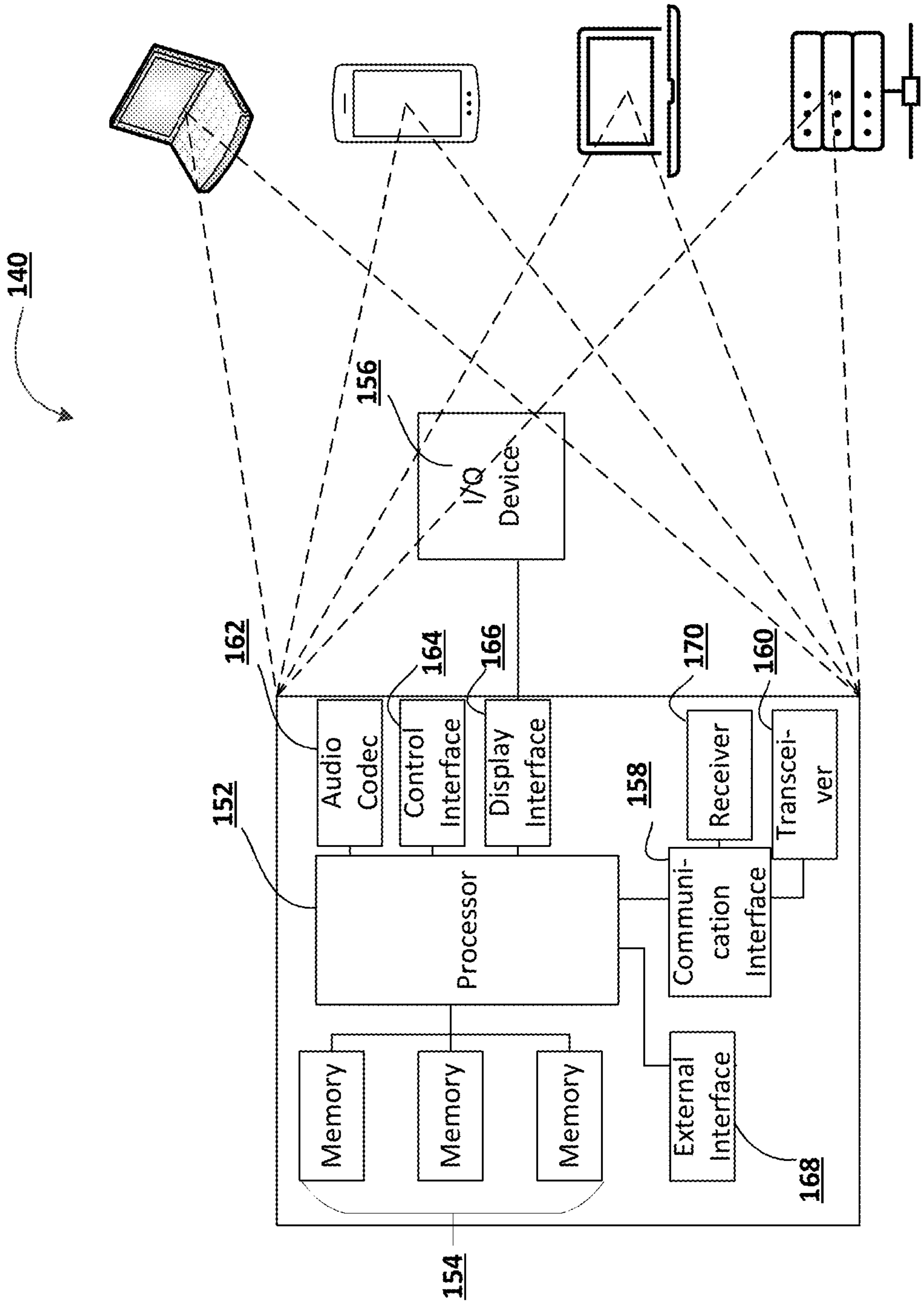
Figure 2:
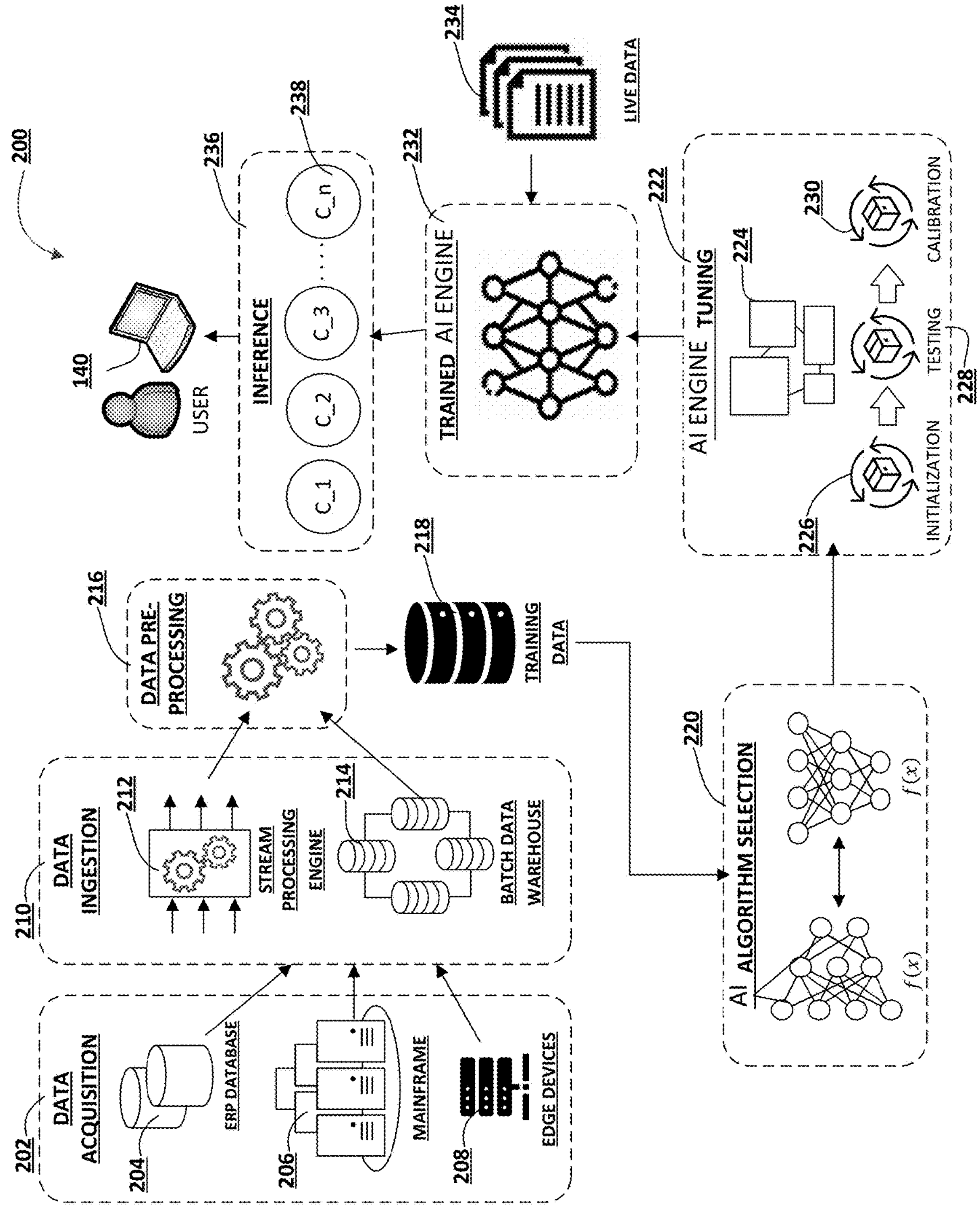
Figure 3:
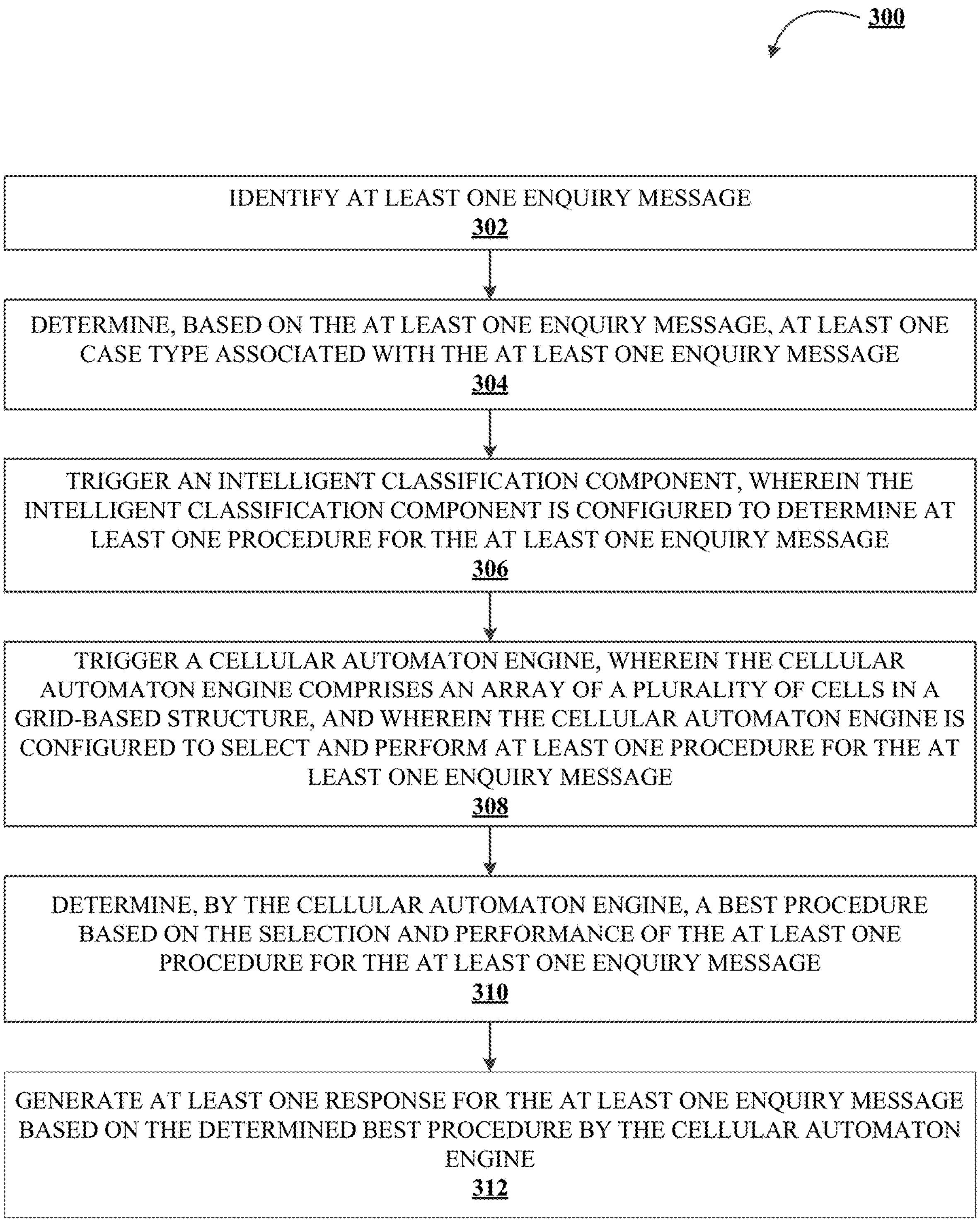
Figure 4:
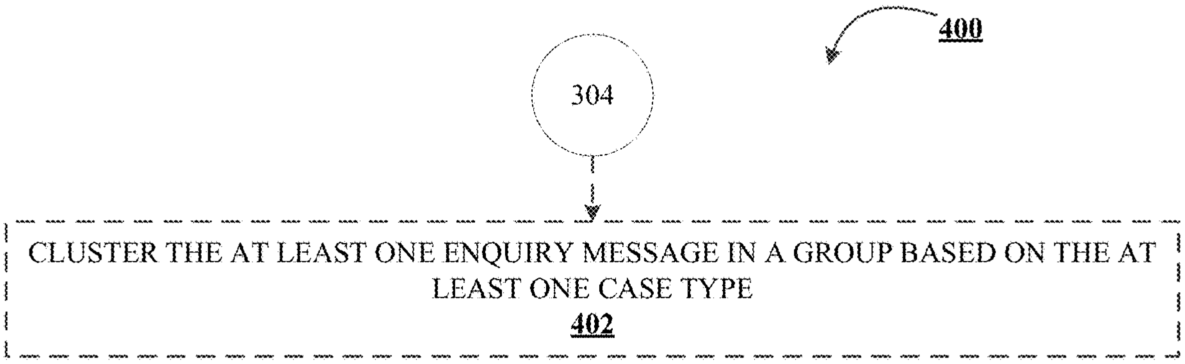
Figure 5:
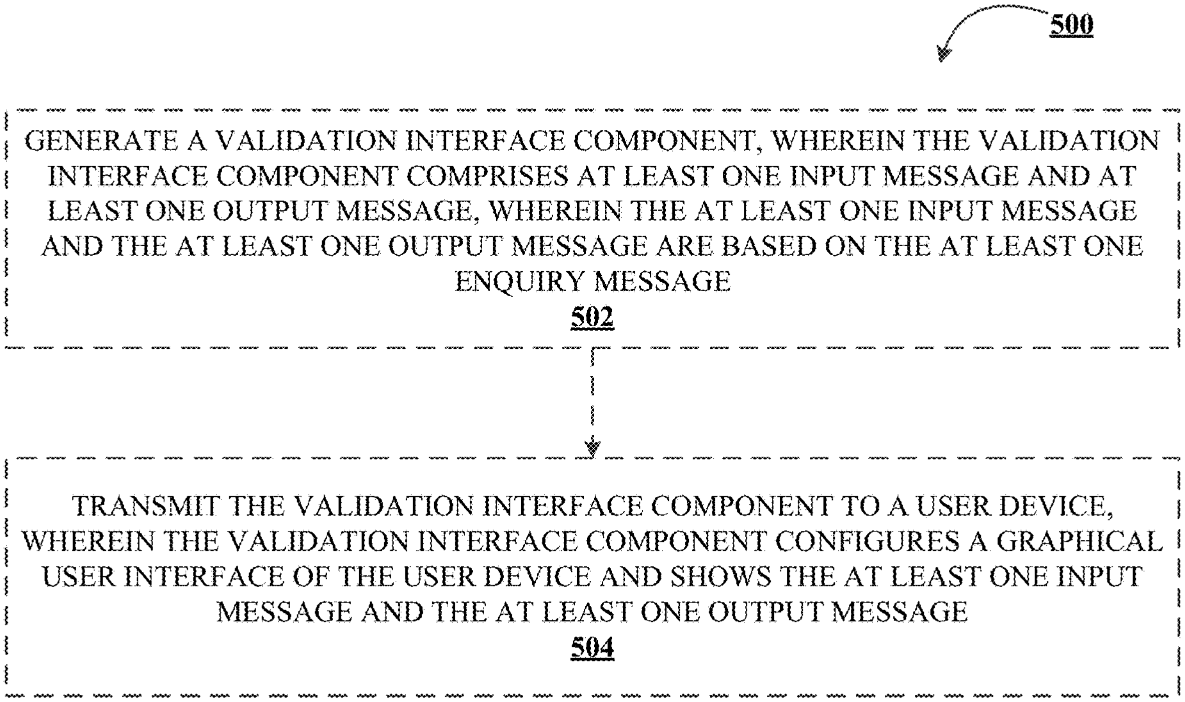
Figure 6:
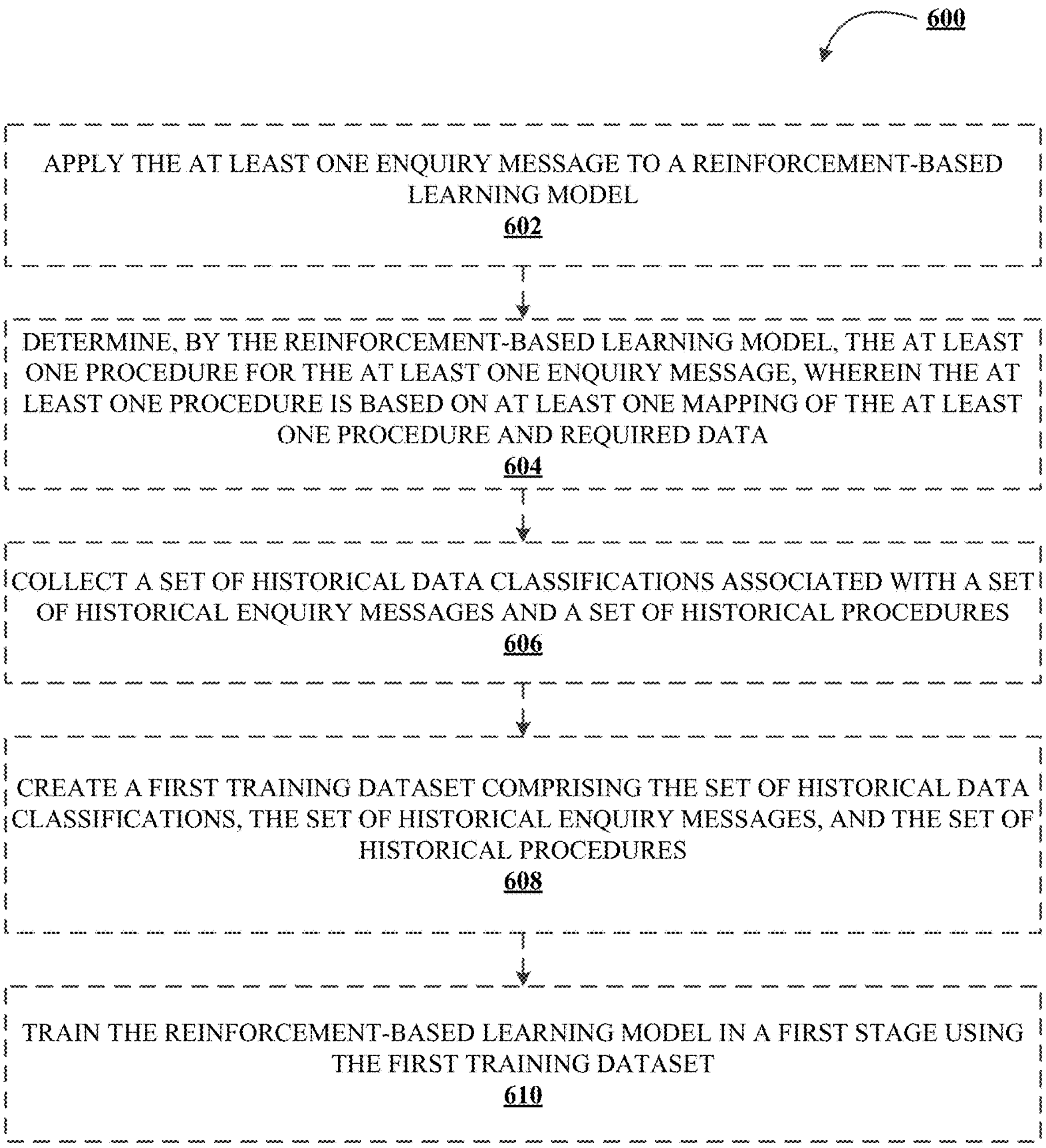
Figure 7:
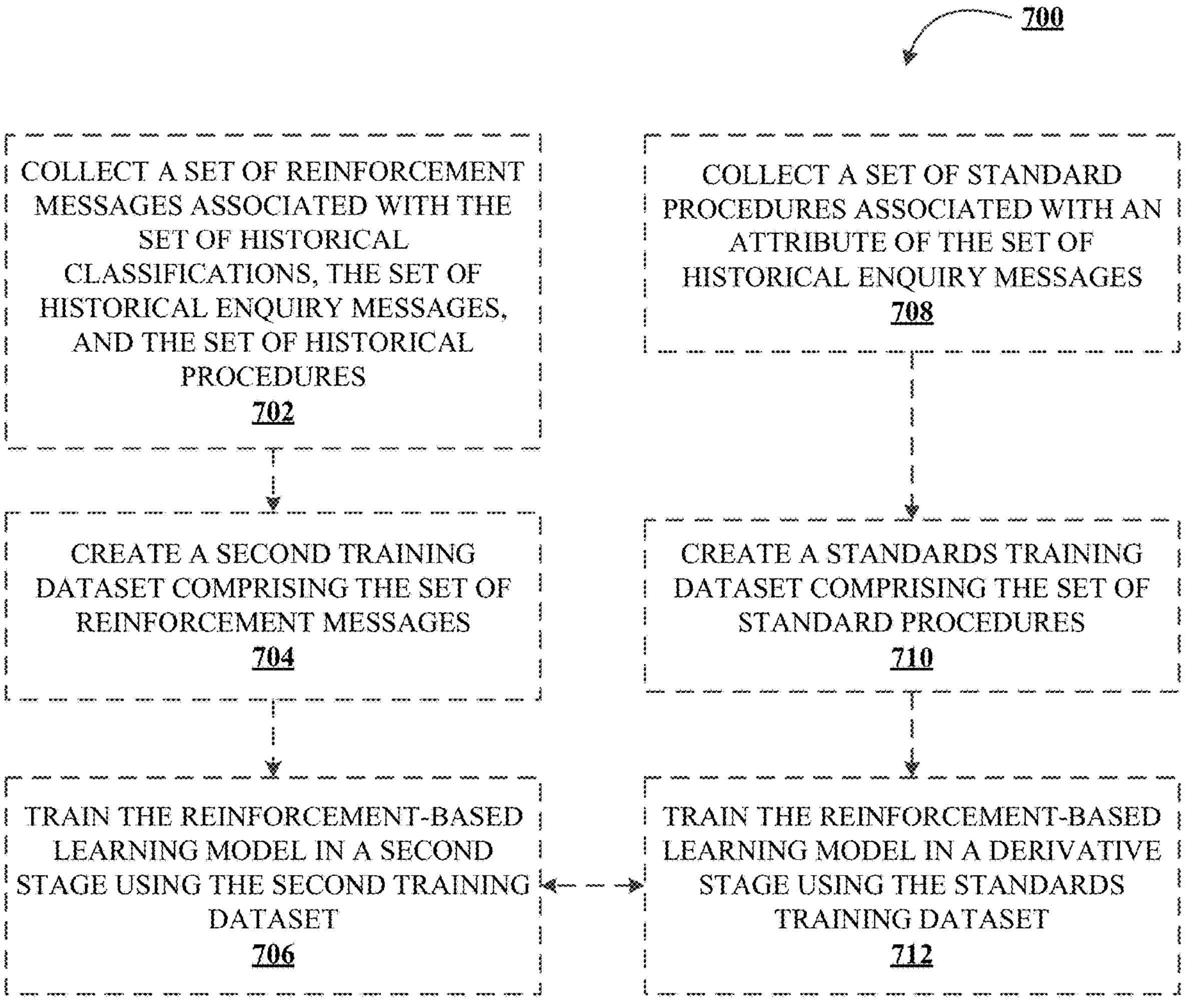
Figure 8:
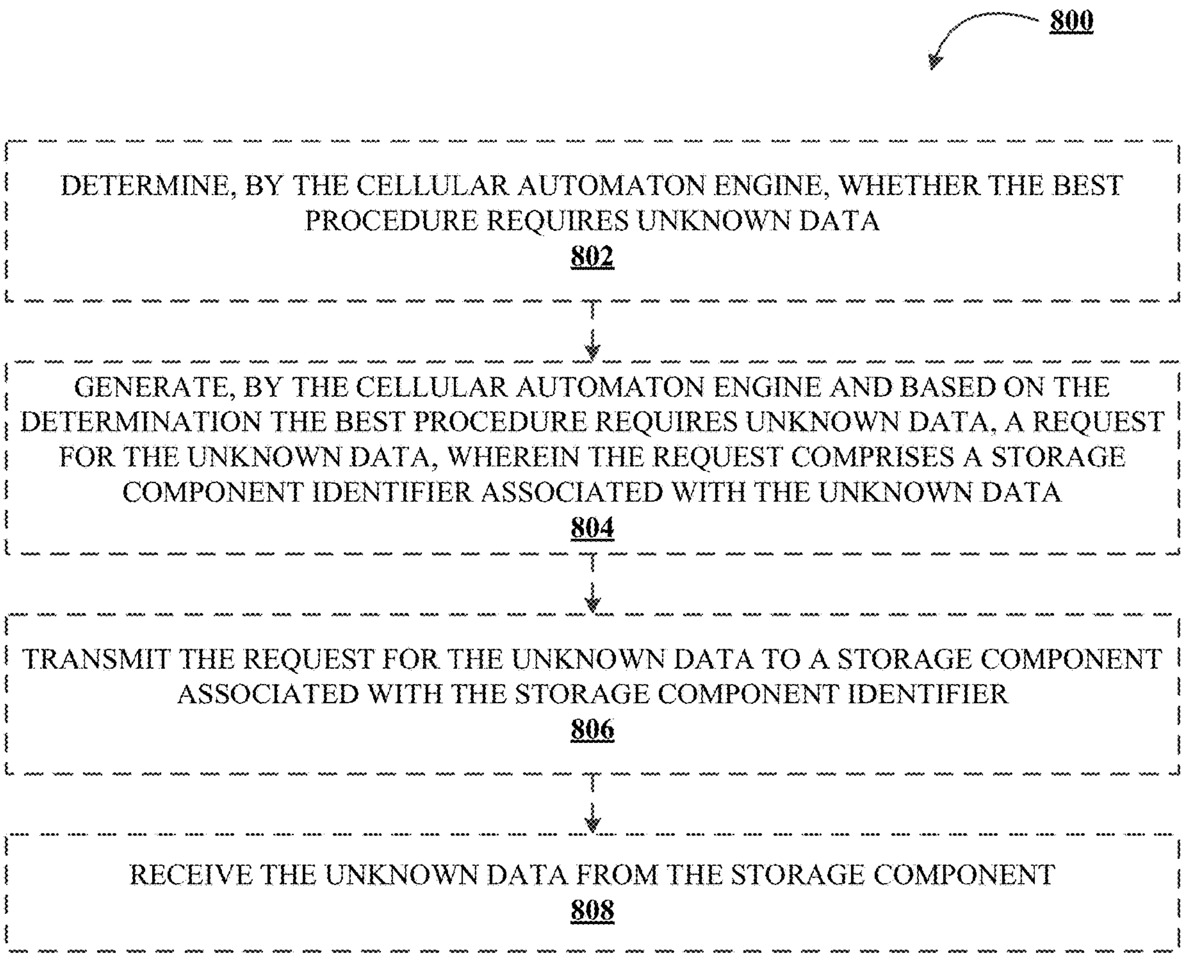

Having thus described embodiments of the invention in general terms, reference will now be made the accompanying drawings, wherein:

FIGS. 1A-1C illustrates technical components of an exemplary distributed computing environment for dynamically determining procedures for electronic communications using cellular automaton processing, in accordance with an embodiment of the invention;

FIG. 2 illustrates technical components of an exemplary artificial intelligence (AI) engine, in accordance with an embodiment of the disclosure;

FIG. 3 illustrates a process flow for dynamically determining procedures for electronic communications using cellular automaton processing, in accordance with an embodiment of the disclosure;

FIG. 4 illustrates for clustering enquiry messages based on case types, in accordance with an embodiment of the disclosure;

FIG. 5 illustrates for generating and transmitting a validation interface component, in accordance with an embodiment of the disclosure; and FIG. 6 illustrates a process flow for training a reinforcement-based learning model in a first stage, in accordance with an embodiment of the disclosure;

FIG. 7 illustrates a process flow for training the reinforcement-based learning model in a second stage and/or in a derivative stage, in accordance with an embodiment of the disclosure; and FIG. 8 illustrates a process for generating a request for unknown data based on the best procedure determined by the cellular automaton engine, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a “user interface” may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an “engine” may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. For purposes of this invention, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, interactions involving a user's resource or account. Unless specifically limited by the context, a "resource transfer" a "transaction", "transaction event" or "point of transaction event" may refer to any activity between a user, an entity, or any combination thereof.

Electronic messages which are regularly automatically sorted and responded to within computing networks and systems. However, when electronic messages are received and cannot be automatically sorted, classified, or responded to, then manual intervention is often required. The problem of manual intervention occurring for these electronic messages is tens of thousands may be received daily and manual intervention may not be possible when there is so much demand. The problem is even further exacerbated when the response necessary to deal with the electronic communication requires searching for, receiving, and gathering data from different storage components, databases, and/or the like. Thus, there exists a need for a system, method, and/or apparatus that can automatically, dynamically, efficiently, and securely determine procedures for dealing with electronic communications and generating responses therefrom with little to no manual intervention (e.g., only manual intervention that is absolutely necessary and which the system itself may determine).

The disclosure herein provides a system that receives electronic communications (such as an inter-entity message, or a Society for Worldwide Interbank Financial Telecommunications (SWIFT) messages between financial institutions which may comprise a enquiry or query that needs to be solved), uses machine learning and/or artificial intelligence to determine which case type the electronic case should be associated with, uses a plugin to validate the data of the electronic communication, and uses a cellular automaton processor engine to determine the procedure(s) for dealing with the electronic communication (e.g., allowing a transaction associated with the electronic communication's query, requesting more electronic communications, determining similar steps/procedures to take dynamically and automatically, and/or the like). The use of a cellular automaton processing engine allows the system to have a dynamic and flexible approach to determining which procedures to process the electronic communication and what steps to take in response to resolve the query embodied in the electronic communication.

Accordingly, the present disclosure provides for identifying at least one enquiry message (e.g., a SWIFT message and other such queries, inter-entity messages, and/or the like); determine, based on the at least one enquiry message, at least one case type (e.g., a type of investigation that must occur to get a response for the enquiry message, and/or the like) associated with the at least one enquiry message; triggering an intelligent classification component, wherein the intelligent classification component is configured to determine at least one procedure for the at least one enquiry message; trigger a cellular automaton engine, wherein the cellular automaton engine comprises an array of a plurality of cells in a grid-based structure, and wherein the cellular automaton engine is configured to select and perform at least one procedure for the at least one enquiry message; determine, by the cellular automaton engine, a best procedure based on the selection and performance (e.g., such as through a state-by-state determination of the best procedure(s)) of the at least one procedure for the at least one enquiry message; and generate at least one response for the at least one enquiry message based on the determined best procedure by the cellular automaton engine.

What is more, the present invention provides a technical solution to a technical problem. As described herein, the technical problem includes the automatic and dynamic determination of procedures when dealing with electronic enquiry messages. The technical solution presented herein allows for a system, method, and apparatus for dynamically determining the best procedure(s) or process(es) for electronic communications, especially those electronic communications that require further data retrieval in order to complete the procedure/process and generate a response. In particular, the disclosure provided herein is an improvement over existing solutions to the automatic and dynamic determination of procedures to reach a solution for an electronic communication, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing AI to generate a time-sensitive notifications related to configuration of GUIs 100, in accordance with an embodiment of the invention. As shown in FIG. 1A, the distributed computing environment 100 contemplated herein may include a system 130 (i.e., a system like the one herein described), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236. Additionally, and/or alternatively, each use of the AI engine's subsystem components may be used to generate and train a machine learning model in the same or similar way as that described hereinbelow. Thus, the use of an AI engine may be interchangeably used with a trained machine learning model in much the same way as the description provided below, including a data acquisition engine 202, a data ingestion engine 210, data pre-processing engine 216, a machine learning (ML) tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for dynamically determining procedures for electronic communications using cellular automaton processing, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. In some embodiments, an artificial intelligence engine (e.g., such as the AI engine shown in FIG. 2) may perform some or all of the steps described in process flow 300.

As shown in block 302, the process flow 300 may include the step of identifying at least one enquiry message. As used herein, an enquiry message comprises data requesting an action be taken or a response be generated to resolve an issue identified within the enquiry message. For instance, and by way of example, an enquiry message may be a Society for Worldwide Interbank Financial Telecommunications (SWIFT) message which may comprise a different style and/or format based on the generating entity (e.g., the entity or bank that generated the SWIFT message and may differ from the recipient's styles and/or formats for their SWIFT messages). In some embodiments, such an enquiry message may comprise data requesting a procedure be done in order to resolve an issue identified by the generating entity, such as an issue with a data transmission (e.g., a resource transmission may have issues being completed due to a lack of data for the recipient entity, such as a recipient that will receive the resource transmission), and/or the like.

Historically, a procedure to resolve enquiry message may have needed to be determined manually, and the data needed to resolve enquiry and complete the determined procedure may also have needed to be identified manually, searched manually, and requested manually. Such a method for resolving enquiry messages would lead to greater component usage (e.g., when determining which procedure to use computing sources may be used at greater levels, and especially when searching for data needed to complete the procedure when storage locations may be unknown or difficult to access), slower processing speeds, lower efficiency (e.g., manual intervention and resolution takes longer to determine the procedure when such a determination is carried out sequentially until one is determined as the best procedure), and leads to potential bottlenecks as more enquiry messages are received than can be dealt with. For instance, in some instances, at least 75,000 enquiry messages may be identified or received monthly, and when each enquiry message is handled and resolved manually, only a portion of the 75,000 enquiry messages are resolved within the month period and some will be left over in the next month along with a new batch of enquiry messages.

In some embodiments, an enquiry message may be identified based receiving the enquiry message at a recipient entity's network (e.g., whereby the enquiry message is transmitted from a generating entity—such as a generating bank—to a recipient entity—a recipient bank that may need to resolve the enquiry message by collecting data, following a particular procedure, and corresponding with the generating entity and/or other such related entities. In some embodiments, the system may identify the enquiry message based on accessing a database of unresolved enquiry messages, whereby the enquiry message that has been unresolved the longest may be identified as the current enquiry message to be resolved. In some embodiments, the system may identify a plurality of enquiry messages to resolve at the same time, such that the enquiry messages are addressed and handled as they are received and in near-real time or as close to real time as possible.

In some embodiments, the enquiry message may be parsed by a legacy application, such as a legacy application configured with a robotic process automation (RPA) component, that is configured to register the enquiry message, decipher the contents of the enquiry message, extract key data from the contents of the enquiry message, and capture other parameters that may be of importance throughout this process.

As shown in block 304, the process flow 300 may include the step of determining—based on the at least one enquiry message—at least one case type associated with the at least one enquiry message. In some embodiments, the system may determine—based on the enquiry message—at least one case type of the enquiry message, whereby the case type is based on the topic identified within the enquiry message. For instance, and where an enquiry message comprises an issue associated with a financial institution transfer (e.g., a resource transfer between financial institutions or banks cannot be completed), then the case type may mirror the issue. Similarly, such case types may comprise but is not limited to resource transfers, merchant resource transfers, checks, securities, treasury markets (e.g., foreign exchanges of resources, resource markets, and/or the like), travelers checks, resource management, user account management, resource advances (e.g., loans), and/or the like. In some embodiments, these case types are predefined by at least one entity (such as the receiving entity for the enquiry message) or a plurality of entities (such as a grouping of entities that all agree on each of the case types).

Additionally, and in some embodiments, the case types may be determined by the system based on the content of the enquiry message (e.g., the characters, strings, of characters, and/or the like within the enquiry message), the entities involved with the enquiry message (e.g., where one of the entities listed as involved is a merchant, the case type may be a merchant resource transfer), the identifier associated with the enquiry message (e.g., some enquiry messages may comprise blocks of data, such as headers, a message content, and a trailer, and such data blocks may comprise strings of data identify the case type), and/or the like. In some embodiments, the system may comprise a machine learning model and/or an AI engine, which is configured to determine and assign the case type to the at least one enquiry message. Such a machine learning model and/or AI engine may be trained to parse the data/content of the enquiry message, determine the key components of the enquiry message, and determine the correct case type (or the closest case type to the enquiry message).

As shown in block 306, the process flow 300 may include the step of triggering an intelligent classification component, wherein the intelligent classification component is configured to determine at least one procedure for the at least one enquiry message. As used herein, the intelligent classification component comprises an AI engine and/or machine learning model to determine and map at least one procedure for the enquiry message. In this manner, the intelligent classification component determines at least one procedure (e.g., at least one potential procedure) for resolving the enquiry message, whereby the at least one procedure may or may not be implemented for solving the issue of the enquiry message. Thus, and as an example, the intelligent classification component—and based on the case type determined—can determine a plurality of potential procedures that may work to resolve the issue identified in the enquiry message and based on the determined case type.

In some embodiments, the intelligent classification component may additionally and/or alternatively map the potential procedure(s) to determine each of the steps of the potential procedure(s) before starting the process outlined in the potential procedure(s). Based on this mapping, and in some embodiments, the intelligent classification component may determine which potential procedures to use in the following step based on the number of steps they comprise, whereby the procedures with the least number of steps and/or the least number of requests (which is described in further detail below) for unknown data may be chosen as the potential procedure(s) to try in the cellular automaton engine described below.

Additionally, and as used herein, the term "trigger" refers to an automatic initiation and/or the automatic launch of the associated component or process. For instance, and by way of example here, the trigger of the intelligent classification component comprises the automatic launch of the intelligent classification component to determine the at least one procedure, without manual intervention or manual launching.

As shown in block 308, the process flow 300 may include the step of triggering a cellular automaton engine, wherein the cellular automaton engine comprises an array of a plurality of cells in a grid-based structure, and wherein the cellular automaton engine is configured to select and perform at least one procedure for the at least one enquiry message. As used herein, the cellular automaton engine is a self-initiating and self-propelled computing component/device which performs different functions through an array of cells (e.g., one-dimensional, two-dimensional, three-dimensional, and/or the like), whereby each cell is an identically programmed automaton. Additionally, and as used herein, automaton (automata is the plural form) refers to an abstract model of machines that perform computations on an input by moving through a series of states or configurations, where each state determines the transition function to the next state or configuration. Additionally, the automata in the array may interact with and be affected by their neighbors. Thus, state changes in a cell will depend not only on its current state, but also on the states of neighboring cells. In other words, the cellular automaton engine is a discrete dynamic system comprising an orderly network of cells (e.g., such as based on the potential procedures identified and determined in block 306), whereby each cell is decided by its previous state and its neighbors (e.g., the left and right closest neighboring cell states). Additionally, and in some embodiments, the determination of the current cell based on its neighbor cells and its previous state cell is initiated following a local update rule (e.g., to update the state to a current state) based on the data available in the cellular automaton engine.

Such a cellular automaton engine may comprise a grid of cells, whereby each cell can be in a finite number of states (e.g., on and off, and/or the like), and where the grid of cells may be in a finite number of dimensions for each of the cells. As used herein, the dimensions for the cells refers to a weightage for each cell based on the state for each cell (e.g., some cells may be weighted greater than other cells, and some cells may be weighted greater based on both the current state, the previous state, the neighboring state, and the cell itself). In this manner, the cells themselves and their importance in the overall process of the cellular automaton engine may be dynamic and change automatically based on each determined state.

Upon generating the grid of cells and determining the finite number of states, dimensions, and/or the like, the system may determine the neighborhood of cells surrounding each cell (which is based on the current cell itself). Additionally, and at the beginning of the initiation of the cellular automaton engine, an initial state is set or selected (e.g., at time equals zero), such as by assigning an initial state for each cell, and then an updated state for each cell is generated by advancing time (e.g., time=the previous time plus one, or intervals of one), whereby the updated state for each cell is determined automatically based on the previous state and based on its neighborhood.

Thus, and as used herein, the cellular automaton engine may move through each of the at least one procedure(s) (e.g., potential procedure(s)) identified/determined by the system and determine which of the at least one procedure(s) is the best procedure to resolve the enquiry message. In other words, each of the cells within the array of cells may correspond to a step in the at least one procedure (e.g., potential procedures determined in block 306), whereby each step in the at least one procedure is automatic and self-executing and based on other similar steps in its neighborhood of cells. By way of non-limiting example, and where the enquiry message comprises an issue of a resource transfer not being completed due to data missing in a field of the recipient of the resource transfer, and where the recipient is associated with a bank different than the resource transfer originator's bank, then the system may identify a plurality of potential procedures that could occur in order to complete the resource transfer based on filling in the missing data for the recipient. Thus, and once a few potential procedures are determined, each of the potential procedures may be input to the cellular automaton engine and the cellular automaton engine may determine which of the procedures (1) can be completed in order to resolve the issue of the enquiry message (gather all the missing data and complete the resource transfer), (2) which of the potential procedures can resolve the issue the fastest and with the least amount of computing resource consumption (e.g., with the smallest number of steps and with the fewest request to outside computing sources for the missing data), and (3) can resolve the issue without causing data breaches of the missing data or the data already known. The cellular automaton engine may run each of the potential procedures automatically, generate requests for unknown data (e.g., any missing data) automatically, transmit those requests automatically, gather the unknown data upon receipt, and complete the procedures by itself in order to determine which procedure should be used for solving the issue identified in the enquiry message.

In some embodiments, and where a procedure cannot be determined before starting the cellular automaton engine, the cellular automaton engine may generate its own procedures based on previous data of similar enquiry messages, previous data of procedures used, and similar data of the case types for the similar enquiry messages. Additionally, and in some embodiments, the cellular automaton engine may dynamically change its procedure (e.g., the cells with which it is executing based on the current state, previous state, and neighboring states) if data cannot be found or received and may update its procedure(s) based on that information of the irretrievable data in real time. Thus, and even where a potential procedure cannot be completed at all, the cellular automaton engine may come up with a brand new procedure (such as based on a combination of different potential procedures) to solve the issue of the enquiry message. Such a brand new procedure may be generated by the cellular automaton engine and the system itself, without the need for manual intervention.

As shown in block 310, the process flow 300 may include the step of determining—by the cellular automaton engine—a best procedure based on the selection and performance of the at least one procedure for the at least one enquiry message. Thus, the cellular automaton engine may determine the best or top procedure that should be used to resolve the enquiry message. As used herein, the term best or top within "best procedure" or "top procedure" refers to a procedure identified by the cellular automaton engine as meeting the first and second criteria of the following three criteria and as having the greatest efficiency of the third criteria: (1) resolving the issue of the enquiry message, (2) resolving the issue of the enquiry message without causing data breaches of the missing data or the data already known, and (3) efficiency for resolving the issue of the enquiry message with the least amount of time and/or the least amount of computing resources (e.g., the greater the number of requests for unknown data, the greater the number of computing resources). In some embodiments, the cellular automaton engine may be configured to weight the efficiency of the amount of time greater than the use of the computing resources (e.g., such that time is considered of utmost importance) or vice versa (e.g., such that the least amount of computing resources used is of the utmost importance).

As shown in block 312, the process flow 300 may include the step of generating at least one response for the at least one enquiry message based on the determined best procedure by the cellular automaton engine. For example, the system may generate—based on the best procedure determined—at least one response for the enquiry message, whereby the at least one response may comprise a response to the generating entity of the enquiry message indicating that the enquiry message has been resolved. In some embodiments, and in the instance where the enquiry message requests an action be taken (e.g., a resource transfer be completed), the at least one response may request the action be taken and may provide any data that may have been missing in order to complete the resource transfer. In some embodiments, and where an action is request to be taken to resolve the enquiry message's issue, the transmission of the response from the system may comprise an automatic trigger or initiation for the action to be taken upon receiving or identifying the at least one response at the receiving computing system or receiving network.

FIG. 4 illustrates a process flow 400 for clustering enquiry messages based on case types, in accordance with an embodiment of the invention. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. In some embodiments, an artificial intelligence engine (e.g., such as the AI engine shown in FIG. 2) may perform some or all of the steps described in process flow 400.

In some embodiments, and as shown in block 402, the process flow 400 may include the step of clustering the at least one enquiry message in a group based on the at least one case type. As used herein, the term "cluster" and/or "clustering" refers to a grouping, organizing, linking, and/or the like of the enquiry message(s) based on the determined case type. In this manner, each of the enquiry messages may be organized based on the case type and may be handled or resolved together or with similar procedures. Additionally, and in some embodiments, historical enquiry messages that have already been resolved (e.g., with historical procedures) may be in the group with the newly identified enquiry message(s) and a similar procedure to the historical procedure may be used.

FIG. 5 illustrates a process flow 500 for generating and transmitting a validation interface component, in accordance with an embodiment of the invention. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. In some embodiments, an artificial intelligence engine (e.g., such as the AI engine shown in FIG. 2) may perform some or all of the steps described in process flow 500.

In some embodiments, and as shown in block 502, the process flow 500 may include the step of generating a validation interface component, wherein the validation interface component comprises at least one input message and at least one output message, and wherein the at least one input message and the at least one output message are based on the at least one enquiry message.

For example, the system may—in some embodiments—generate a validation interface component comprising an at least one input message and at least one output message, whereby the input message(s) and the output message(s) are based on the enquiry message(s). In this manner, an input message may comprise data parsed and organized in a computer-readable format from the enquiry message (which may additionally include the metadata associated with the enquiry message including the metadata associated with the issue identified by the enquiry message). For example, and where the enquiry message comprises an issue with a resource transfer not being completed due to missing data, the input message generated may comprise the data of the resource transfer before completion and all the data necessary for completion on the generating bank's side (e.g., the transferring entity for the resource transfer), and the output message may comprise the data of the resource transfer if it had been completed (e.g., but may contain missing data in at least one portion of the output message that is necessary to complete the resource transfer). In this manner, the input message and the output message are easily comparable.

Similarly, and by way of generating the validation interface component, the validation interface component may comprise data in a computer-readable format for the input message and the output message, whereby the data may be used by a user device to configure a graphical user interface (GUI) of the user device to show the information of the input message and the output message in a human-readable format.

In some embodiments, the validation interface component may be generated using an artificial intelligence (AI) based optical character recognition (OCR) component, and the AI based OCR component may be configured to validate the at least one input message and the at least one output message. Such an AI based OCR component may be configured to recognize text from the enquiry message (e.g., even where the enquiry message comprises text, characters, and digital representations) and/or the metadata associated with the enquiry message in order to generate the input message and the output message. In some embodiments, such an AI based OCR component may be unconnected to underlying entity systems (such as underlying bank networks and other such databases, storage components, and/or the like), such that the data within those entity systems remain private and secure. Thus, and in those embodiments, the AI based OCR component may base its generation of the input messages and/or the output messages on the enquiry message the associated metadata only.

In some embodiments, the validation interface component may comprise a plurality of validation interface components, and each validation interface component may comprise the at least one input message or the at least one output message. For example, and in some embodiments, the validation interface component may comprise a plurality of pop-up windows, a plurality of tabs, a plurality of plug-ins, and/or the like, which are used to show both the input message(s) and the output message(s) at the same time. As used herein, such tabs, plug-ins, and/or pop-up windows are used to configure the GUI of a user device (such as a user device associated with a client of the system, a manager of the system, and/or the like).

In some embodiments, the validation interface component is overlayed with a legacy application interface component on the GUI of a user device, and the legacy application interface component is based on a legacy application associated with the at least one enquiry message. For instance, the legacy application as used herein may be an application previously used and/or currently used by a client of the system (such as by the recipient entity of the enquiry message) and may be used for validation of the input and output messages before, to process resource transfers, to store and/or update data of resource accounts, and/or the like. In this manner, a user associated with the user device that receives the validation interface component (comprising the legacy application interface component) may view the legacy application, and the input and output messages all at once.

In some embodiments, a validation between the input message and the output message of the validation interface component may occur based on a matching of the input message to the output message to make sure the data of the input message matches the data of the output message (e.g., if there is missing data, where is the missing data). Similarly, and in some embodiments, a validation status may be declared by the AI based OCR component, whereby a validation may be negative where data is missing and the issue underlying the enquiry message cannot be fixed, or whereby the validation may be positive where all the data is correct and present and the issue underlying the enquiry message may be fixed.

In some embodiments, and as shown in block 504, the process flow 500 may include the step of transmitting the validation interface component to a user device, wherein the validation interface component configures a graphical user interface of the user device and shows the at least one input message and the at least one output message. For instance, the validation interface component may be transmitted—such as over a network, like that described with respect to FIG. 1A—to a user device associated with the system. Upon receipt of the validation interface component, the user device may use the validation interface component to configure its GUI to show the information of the validation interface component to the user. Such information may comprise the input message, the output message, and/or the like. In some embodiments, the information may further comprise the legacy application interface component showing the legacy application.

FIG. 6 illustrates a process flow 600 for training a reinforcement-based learning model in a first stage, in accordance with an embodiment of the invention. In some embodiments, a system (e.g., similar to one or more of the systems described herein with respect to FIGS. 1A-1C) may perform one or more of the steps of process flow 600. For example, a system (e.g., the system 130 described herein with respect to FIG. 1A-1C) may perform the steps of process 600. In some embodiments, an artificial intelligence engine (e.g., such as the AI engine shown in FIG. 2) may perform some or all of the steps described in process flow 600.

In some embodiment, and as shown in block 602, the process flow 600 may include the step of applying the at least one enquiry message to a reinforcement-based learning model. For example, and in some embodiments, the system may apply the at least one enquiry message (e.g., identified in block 302 of FIG. 3) to a reinforcement-based learning model, whereby the reinforcement-based learning model may comprise an AI engine and/or a machine learning model, which is configured to determine at least one procedure (e.g., at least one potential procedure) for the enquiry message. In this manner, and as used herein, the enquiry message may be applied to the reinforcement-based learning model, such that the reinforcement-based learning model can process the data of the enquiry message to make its determination(s). Such a reinforcement-based learning model may be pre-trained on previous enquiry messages (e.g., historical enquiry messages), case types, and historical procedures applied to resolving the historical enquiry messages. Such a training process is described in further detail below.

In some embodiments, and as shown in block 604, the process flow 600 may include the step of determining—by the reinforcement-based learning model—the at least one procedure for the at least one enquiry message, wherein the at least one procedure is based on at least one mapping of the at least one procedure and required data. In other words, the reinforcement-based learning model may determine at least one potential procedure for resolving the issue of the enquiry message, whereby the reinforcement-based learning model is trained on previous data (such as previous or historical enquiry messages, historical procedures chosen for resolving those historical enquiry messages, historical case types, and other such data) in order to make an informed and automated decision for potential procedure(s) to try in the cellular automaton engine.

As used herein, the term procedure refers a procedure to resolve the enquiry message, whereby the procedure may comprise a singular step or a plurality of steps to resolve the issue associated with the enquiry message. In some embodiments, the procedure may comprise at least one step involving the transmission of a request to at least one data source (e.g., a database, another system, another computer, a data center, and/or the like), and receiving a response (e.g., data requested) from the data source. In some embodiments, the request may comprise a specific location identifier for where the data is stored that is being requested. Such an embodiment is described in further detail below with respect to FIG. 8.

In some embodiments, and as shown in block 606, the process flow 600 may include the step of collecting a set of historical data classifications associated with a set of historical enquiry messages and a set of historical procedures. For example, the system may collect a set of historical data classifications (i.e., case types for previous or historical enquiry messages), and a set of historical procedures used to resolve the issues of the historical enquiry messages. Such data may be collected from a database(s), a historical record(s), a table(s) stored in a computing system storage component, and/or the like. In some embodiments, the data collected may be from a particular time (e.g., a range of time, such as between the last twenty to fifteen years), and each such collection of data may be from different time ranges, such that the entirety of time where such data is stored is used for training the reinforcement-based learning model.

In some embodiments, and as shown in block 608, the process flow 600 may include the step of creating a first training dataset comprising the set of historical data classifications, the set of historical enquiry messages, and the set of historical procedures. For example, the system may use at least the collected data of block 606 to generate a first training dataset, which may then be used/applied to the reinforcement-based learning model for training the reinforcement-based learning model.

In some embodiments, a plurality of training datasets may be generated based on clusters of historical data classifications, historical enquiry messages, and historical procedures that are collected over different periods of time and/or for different periods of time (e.g., different ranges of time). Similarly, and in some embodiments, a training dataset may be generated based on current enquiry messages, current data classifications, and current procedures for enquiry messages that were recently identified and resolved by the system. In this manner, the current enquiry message(s), the current data classifications, and the current procedures may be used as a feedback loop to the reinforcement-based learning model.

In some embodiments, and as shown in block 610, the process flow 600 may include the step of training the reinforcement-based learning model in a first stage using the first training dataset. Such a training of the reinforcement-based learning model may occur based on applying the at least first training dataset to the reinforcement-based learning model and having the reinforcement-based learning model process the at least first training dataset.

FIG. 7 illustrates a process flow 700 for training the reinforcement-based learning model in a second stage and/or in a derivative stage, in accordance with an embodiment of the invention. In some embodiments, a system (e.g., similar to one or more of the systems described herein with respect to FIGS. 1A-1C) may perform one or more of the steps of process flow 700. For example, a system (e.g., the system 130 described herein with respect to FIG. 1A-1C) may perform the steps of process 700. In some embodiments, an artificial intelligence engine (e.g., such as the AI engine shown in FIG. 2) may perform some or all of the steps described in process flow 700.

In some embodiments, and as shown in block 702, the process flow 700 may include the step of collecting a set of reinforcement messages associated with the set of historical classifications, the set of historical enquiry messages, and the set of historical procedures. For instance, the reinforcement message may comprise a user input, an input from a client of the system, and/or the like, approving or disapproving of the procedure used to resolve the enquiry message. For instance, such a user input may be input at a user device by selecting components on a configure GUI of the user device, whereby the input is automatically transmitted to the system as user feedback. Such feedback may comprise feedback for the procedure used (e.g., the best procedure identified by the cellular automaton engine), the case type, and/or the like.

In some embodiments, the reinforcement messages may comprise historical reinforcement messages for the historical enquiry messages, the historical procedures, the historical case types, and/or the like. Thus, and in some embodiments, the historical reinforcement messages may be collected based on analyzing a database of previously received reinforcement messages, based on collecting the reinforcement messages as they're received, based on identifying the associated historical enquiry messages and the associated historical procedures used.

In some embodiments, and as shown in block 704, the process flow 700 may include the step of creating a second training dataset comprising the set of reinforcement messages. For example, and in some embodiments, the system may generate a second training dataset, whereby the second training dataset comprises the collected reinforcement messages that are associated with the historical data classifications (e.g., historical case types), historical enquiry messages, and/or historical procedures. In some embodiments, individual reinforcement messages may be received and/or collected for each of the historical classifications, historical enquiry messages, and historical procedures (e.g., at least three reinforcement messages are received for the whole set of data).

In some embodiments, and as shown in block 706, the process flow 700 may include the step of training the reinforcement-based learning model in a second stage using the second training dataset. For instance, and similar to the process described above, the reinforcement-based learning model may be trained by applying the second training dataset in a second stage, such that the reinforcement-based learning model can process the data of the second training dataset.

In some embodiments, and as shown in block 708, the process flow 700 may include the step of collecting a set of standard procedures associated with an attribute of the set of historical enquiry messages. In some embodiments, a set of standard procedures comprise protocols, procedures, and/or steps that may normally be followed or carried out by an entity (such as a client of the system, like a bank) once an enquiry message is received and/or identified. In some embodiments, the standard procedure selected may change based on the enquiry message received and/or identified. In some embodiments, the set of standard procedures are collected into a cluster and/or group based on an attribute (e.g., an attribute for the kind of enquiry message it is, the data classification, and/or the like).

In some embodiments, and as shown in block 710, the process flow 700 may include the step of creating a standards training dataset comprising the set of standard procedures. For example, the standard training dataset may be based on the collected set of standard procedures from block 708.

In some embodiments, and as shown in block 712, the process flow 700 may include the step of training the reinforcement-based learning model in a derivative stage using the standards training dataset. For instance, and similar to the process described above, the reinforcement-based learning model may be trained by applying the standards training dataset in a derivative, such that the reinforcement-based learning model can process the data of the standards training dataset. Such a derivative stage may occur in place of the second stage mentioned in block 706, before the second stage mentioned in block 706, and/or after the second stage mentioned in block 706.

FIG. 8 illustrates a process flow 800 for generating a request for unknown data based on the best procedure determined by the cellular automaton engine, in accordance with an embodiment of the invention. In some embodiments, a system (e.g., similar to one or more of the systems described herein with respect to FIGS. 1A-1C) may perform one or more of the steps of process flow 800. For example, a system (e.g., the system 130 described herein with respect to FIG. 1A-1C) may perform the steps of process 800. In some embodiments, an artificial intelligence engine (e.g., such as the AI engine shown in FIG. 2) may perform some or all of the steps described in process flow 800.

In some embodiments, and as shown in block 802, the process flow 800 may include the step of determining—by the cellular automaton engine—whether the best procedure requires unknown data. For instance, the best procedure (as determined in FIG. 3) may require unknown data when data is missing in order to complete the steps of the best procedure (e.g., data not in the enquiry message and not readily available based on metadata associated with the enquiry message may be unknown data), such that the unknown data must be retrieved from a separate component, a separate storage component (e.g., database, table, computing system, and/or the like), a separate person (e.g., send a request to a user device associated with a user account identifier that would know the data), and/or the like.

In some embodiments, and as shown in block 804, the process flow 800 may include the step of generating—by the cellular automaton engine and based on the determination the best procedure requires unknown data—a request for the unknown data, wherein the request comprises a storage component identifier associated with the unknown data. For instance, and in some embodiments, a request for the unknown data may comprise a request for input, a request for gathering the unknown data, a request for copying the unknown data from the storage component, a request for transmitting the unknown data back to the system, and/or the like.

As used herein, the term "storage component identifier" refers to an identifier of a storage component where particular data may be found. Such a storage component identifier comprises a unique string of alphanumeric characters that are computer-readable and can be used to identify the storage component easily and efficiently. In some embodiments, the storage component identifier may comprise a database identifier, a component identifier, a cell identifier (for a cell within a table), a file path, and/or the like.

In some embodiments, the storage component identifier may comprise a user account identifier and an associated user device identifier, such that the system can automatically transmit a request for the unknown data to a user device associated with a user that will know the unknown data and can fill it in. In this embodiment, the request for the unknown data may comprise an interface component (such as an unknown data interface component) that will configure a GUI of the user device to request the input of the unknown data. Upon submission of the unknown data, the input by the user may be automatically and in real-time transmitted back to the system for processing (e.g., by the cellular automaton engine).

In some embodiments, and as shown in block 806, the process flow 800 may include the step of transmitting the request for the unknown data to a storage component associated with the storage component identifier. For example, the system may transmit the request for the unknown data to the storage component (and/or the user device) associated with the storage component identifier (and/or the user device identifier), such that unknown data can be identified and retrieved.

Such a transmission of the request may comprise a transmission over a network, whereby the request may comprise data regarding exactly what is searched for (which may comprise a cell identifier if the storage component is associated with a table of data, a file identifier, a line identifier, and/or the like).

In some embodiments, and as shown in block 808, the process flow 800 may include the step of receiving the unknown data from the storage component. For instance, the system may receive the unknown data from the storage component, such as over a network, from a user device, and/or the like. The unknown data may be packaged for transmission and then automatically opened/parsed once the system receives it, filled into the procedure (e.g., into the cellular automaton engine), and the cellular automaton engine may continue its procedure and states for each cell until the procedure is completed. Further, and where more unknown data is identified by the cellular automaton engine, the cellular automaton engine may follow the same steps as outlined above until all the unknown data is identified and retrieved. Thus, the system may continue these steps for each of the identified unknown data for the procedure(s), until a response is generated, and the enquiry message's issue is resolved.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamically determining procedures for electronic communications using cellular automaton processing, the system comprising:

a memory device with computer-readable program code stored thereon;

at least one processing device, wherein executing the computer-readable code is configured to cause the at least one processing device to perform the following operations:

identify at least one enquiry message;

determine, based on the at least one enquiry message, at least one case type associated with the at least one enquiry message;

trigger an intelligent classification component, wherein the intelligent classification component is configured to determine at least one procedure for the at least one enquiry message;

trigger a cellular automaton engine, wherein the cellular automaton engine comprises an array of a plurality of cells in a grid-based structure, wherein each cell in the array of the plurality of cells corresponds to a step in the at least one procedure, wherein each cell is an identically programmed automaton configured to move through a series of states, and wherein state changes in each cell depend on a current state of the cell and states of neighboring cells in the array according to a local update rule, and wherein the cellular automaton engine is configured to select and perform at least one procedure for the at least one enquiry message;

determine, by the cellular automaton engine, a best procedure based on the selection and performance of the at least one procedure for the at least one enquiry message, wherein the best procedure (i) resolves an issue of the at least one enquiry message, (ii) resolves the issue without causing data breaches, and (iii) has greatest efficiency for resolving the issue with a least amount of computing resources; and generate at least one response for the at least one enquiry message based on the determined best procedure by the cellular automaton engine.

2. The system of claim 1, wherein the computer-readable code is configured to cause the at least one processing device to perform the following operation cluster the at least one enquiry message in a group based on the at least one case type.

3. The system of claim 1, wherein the computer-readable code is configured to cause the at least one processing device to perform the following operations:

generate a validation interface component, wherein the validation interface component comprises at least one input message and at least one output message, wherein the at least one input message and the at least one output message are based on the at least one enquiry message; and transmit the validation interface component to a user device, wherein the validation interface component configures a graphical user interface of the user device and shows the at least one input message and the at least one output message.

4. The system of claim 3, wherein the validation interface component is generated using an artificial intelligence (AI) based optical character recognition (OCR) component, and wherein the AI based OCR component is configured to validate the at least one input message and the at least one output message.

5. The system of claim 3, wherein the validation interface component comprises a plurality of validation interface components, and wherein each validation interface component comprises the at least one input message or the at least one output message.

6. The system of claim 3, wherein the validation interface component is overlayed with a legacy application interface component on the graphical user interface of the user device, and wherein the legacy application interface component is based on a legacy application associated with the at least one enquiry message.

7. The system of claim 1, wherein the intelligent classification component comprises a reinforcement-based learning model, computer-readable code is configured to cause the at least one processing device to perform the following operations:

apply the at least one enquiry message to a reinforcement-based learning model; and determine, by the reinforcement-based learning model, the at least one procedure for the at least one enquiry message, wherein the at least one procedure is based on at least one mapping of the at least one procedure and required data.

8. The system of claim 7, wherein the reinforcement-based learning model is trained by the computer-readable code is causing the at least one processing device to perform the following operations:

collect a set of historical data classifications associated with a set of historical enquiry messages and a set of historical procedures;

create a first training dataset comprising the set of historical data classifications, the set of historical enquiry messages, and the set of historical procedures; and train the reinforcement-based learning model in a first stage using the first training dataset.

9. The system of claim 8, wherein the reinforcement-based learning model is further trained by the computer-readable code is causing the at least one processing device to perform the following operations:

collect a set of reinforcement messages associated with the set of historical classifications, the set of historical enquiry messages, and the set of historical procedures;

create a second training dataset comprising the set of reinforcement messages; and train the reinforcement-based learning model in a second stage using the second training dataset.

10. The system of claim 8, wherein the reinforcement-based learning model is further trained by the computer-readable code is causing the at least one processing device to perform the following operations:

collect a set of standard procedures associated with an attribute of the set of historical enquiry messages;

create a standards training dataset comprising the set of standard procedures; and train the reinforcement-based learning model in a derivative stage using the standards training dataset.

11. The system of claim 1, wherein the computer-readable code is causing the at least one processing device to perform the following operations:

determine, by the cellular automaton engine, whether the best procedure requires unknown data;

generate, by the cellular automaton engine and based on the determination the best procedure requires unknown data, a request for the unknown data, wherein the request comprises a storage component identifier associated with the unknown data;

transmit the request for the unknown data to a storage component associated with the storage component identifier; and receive the unknown data from the storage component.

12. A computer program product for dynamically determining procedures for electronic communications using cellular automaton processing, wherein the computer program product comprises at least one non-transitory computer-readable medium having computer-readable program code portions embodied therein, the computer-readable program code portions which when executed by a processing device are configured to cause the processing device to perform the following operations:

identify at least one enquiry message;

determine, based on the at least one enquiry message, at least one case type associated with the at least one enquiry message;

trigger an intelligent classification component, wherein the intelligent classification component is configured to determine at least one procedure for the at least one enquiry message;

trigger a cellular automaton engine, wherein the cellular automaton engine comprises an array of a plurality of cells in a grid-based structure, wherein each cell in the array of the plurality of cells corresponds to a step in the at least one procedure, wherein each cell is an identically programmed automaton configured to move through a series of states, and wherein state changes in each cell depend on a current state of the cell and states of neighboring cells in the array according to a local update rule, and wherein the cellular automaton engine is configured to select and perform at least one procedure for the at least one enquiry message;

determine, by the cellular automaton engine, a best procedure based on the selection and performance of the at least one procedure for the at least one enquiry message, wherein the best procedure (i) resolves an issue of the at least one enquiry message, (ii) resolves the issue without causing data breaches, and (iii) has greatest efficiency for resolving the issue with a least amount of computing resources; and generate at least one response for the at least one enquiry message based on the determined best procedure by the cellular automaton engine.

13. The computer program product of claim 12, wherein the computer-readable program code portions which when executed by the processing device are configured to cause the processing device to perform the following operation:

cluster the at least one enquiry message in a group based on the at least one case type.

14. The computer program product of claim 12, wherein the computer-readable program code portions which when executed by the processing device are configured to cause the processing device to perform the following operations:

generate a validation interface component, wherein the validation interface component comprises at least one input message and at least one output message, wherein the at least one input message and the at least one output message are based on the at least one enquiry message; and transmit the validation interface component to a user device, wherein the validation interface component configures a graphical user interface of the user device and shows the at least one input message and the at least one output message.

15. The computer program product of claim 12, wherein the computer-readable program code portions which when executed by the processing device are configured to cause the processing device to perform the following operations:

apply the at least one enquiry message to a reinforcement-based learning model; and determine, by the reinforcement-based learning model, the at least one procedure for the at least one enquiry message, wherein the at least one procedure is based on at least one mapping of the at least one procedure and required data.

16. The computer program product of claim 15, wherein the computer-readable program code portions which when executed by the processing device are configured to cause the processing device to perform the following operations:

collect a set of historical data classifications associated with a set of historical enquiry messages and a set of historical procedures;

create a first training dataset comprising the set of historical data classifications, the set of historical enquiry messages, and the set of historical procedures; and train the reinforcement-based learning model in a first stage using the first training dataset.

17. A computer implemented method for dynamically determining procedures for electronic communications using cellular automaton processing, the computer implemented method comprising:

identifying at least one enquiry message;

determining, based on the at least one enquiry message, at least one case type associated with the at least one enquiry message;

triggering an intelligent classification component, wherein the intelligent classification component is configured to determine at least one procedure for the at least one enquiry message;

triggering a cellular automaton engine, wherein the cellular automaton engine comprises an array of a plurality of cells in a grid-based structure, wherein each cell in the array of the plurality of cells corresponds to a step in the at least one procedure, wherein each cell is an identically programmed automaton configured to move through a series of states, and wherein state changes in each cell depend on a current state of the cell and states of neighboring cells in the array according to a local update rule, and wherein the cellular automaton engine is configured to select and perform at least one procedure for the at least one enquiry message;

determining, by the cellular automaton engine, a best procedure based on the selection and performance of the at least one procedure for the at least one enquiry message, wherein the best procedure (i) resolves an issue of the at least one enquiry message, (ii) resolves the issue without causing data breaches, and (iii) has greatest efficiency for resolving the issue with a least amount of computing resources; and generating at least one response for the at least one enquiry message based on the determined best procedure by the cellular automaton engine.

18. The computer implemented method of claim 17, the computer implemented method further comprising clustering the at least one enquiry message in a group based on the at least one case type.

19. The computer implemented method of claim 17, the computer implemented method further comprising:

generating a validation interface component, wherein the validation interface component comprises at least one input message and at least one output message, wherein the at least one input message and the at least one output message are based on the at least one enquiry message; and transmitting the validation interface component to a user device, wherein the validation interface component configures a graphical user interface of the user device and shows the at least one input message and the at least one output message.

20. The computer implemented method of claim 17, the computer implemented method further comprising:

applying the at least one enquiry message to a reinforcement-based learning model; and determining, by the reinforcement-based learning model, the at least one procedure for the at least one enquiry message, wherein the at least one procedure is based on at least one mapping of the at least one procedure and required data.

* * * * *